(12) United States Patent
Baranyai et al.

(10) Patent No.: US 11,951,892 B2
(45) Date of Patent: Apr. 9, 2024

(54) MOTOR VEHICLE HAVING A DEVICE FOR PREPARING A BEVERAGE AND METHOD FOR PREPARING A BEVERAGE

(71) Applicant: AUDI AG, Ingolstadt (DE)

(72) Inventors: Markus Baranyai, Bad Wimpfen (DE); Markus Ruf, Waldstetten (DE)

(73) Assignee: AUDI AG, Ingolstadt (DE)

( * ) Notice: Subject to any disclaimer, the term of this patent is extended or adjusted under 35 U.S.C. 154(b) by 849 days.

(21) Appl. No.: 17/046,709

(22) PCT Filed: Mar. 4, 2019

(86) PCT No.: PCT/EP2019/055298
§ 371 (c)(1),
(2) Date: Oct. 9, 2020

(87) PCT Pub. No.: WO2019/197078
PCT Pub. Date: Oct. 17, 2019

(65) Prior Publication Data
US 2021/0114501 A1 Apr. 22, 2021

(30) Foreign Application Priority Data
Apr. 12, 2018 (DE) ...................... 10 2018 205 554.8

(51) Int. Cl.
| | |
|---|---|
| B60N 3/18 | (2006.01) |
| A47J 31/00 | (2006.01) |
| A47J 31/30 | (2006.01) |
| A47J 31/40 | (2006.01) |
| H01M 8/04291 | (2016.01) |

(52) U.S. Cl.
CPC .............. *B60N 3/18* (2013.01); *A47J 31/005* (2013.01); *A47J 31/30* (2013.01); *A47J 31/40* (2013.01); *H01M 8/04291* (2013.01); *H01M 2250/20* (2013.01)

(58) Field of Classification Search
CPC . B60N 3/18; A47J 31/005; A47J 31/30; A47J 31/40; H01M 8/04291; H01M 2250/20; Y02E 60/50; Y02E 90/40
See application file for complete search history.

(56) References Cited

U.S. PATENT DOCUMENTS

| | | | |
|---|---|---|---|
| 2003/0155160 A1 | 8/2003 | Nomura et al. | |
| 2013/0189594 A1* | 7/2013 | Breit ...................... | B64D 11/04 165/41 |
| 2015/0028670 A1* | 1/2015 | Boodaghians ......... | B64D 11/04 307/9.1 |

(Continued)

FOREIGN PATENT DOCUMENTS

| | | |
|---|---|---|
| DE | 10 2008 007 254 A1 | 8/2008 |
| DE | 10 2014 118 826 A1 | 6/2016 |

(Continued)

*Primary Examiner* — Vishal Pancholi
(74) *Attorney, Agent, or Firm* — Seed IP Law Group LLP

(57) ABSTRACT

A motor vehicle is provided with at least one fuel cell and a device for preparing a beverage, which has a steam and/or liquid dispenser for dispensing a liquid into a vessel. A supply line is provided between the at least one fuel cell and the steam and/or liquid dispenser for supplying product water generated in the at least one fuel cell to the steam and/or liquid dispenser. A method for preparing a beverage is also provided.

9 Claims, 2 Drawing Sheets

(56) References Cited

U.S. PATENT DOCUMENTS

2015/0364780 A1* 12/2015 Libis ................. H01M 8/04992
                                                                  429/429

FOREIGN PATENT DOCUMENTS

| EP | 2 621 010 A1 | 7/2013 |
| WO | 01/72187 A1 | 10/2001 |
| WO | 2013/136286 A2 | 9/2013 |
| WO | 2014/111861 A1 | 7/2014 |
| WO | 2018/194475 A1 | 10/2018 |

* cited by examiner

MOTOR VEHICLE HAVING A DEVICE FOR PREPARING A BEVERAGE AND METHOD FOR PREPARING A BEVERAGE

BACKGROUND

Technical Field

Embodiments of the invention relate to a motor vehicle with at least one fuel cell and with a device for preparing a beverage, in particular a hot beverage, which has a steam and/or liquid dispenser for dispensing a liquid into a vessel.

Description of the Related Art

DE 10 2008 007 254 A1 describes a device and a method for preparing liquid food in a vehicle operated by means of fuel cells, with water being taken from a water bottle and heated. The heated water is then fed into a vessel. The disadvantage here is the dependence on an external water source in the form of the water bottle. If this water bottle contains only a small amount of water or if it is even empty, no more beverage can be prepared. In addition, heating the water from the water bottle requires additional energy, which must be made available to the system.

BRIEF SUMMARY

It is therefore an object of embodiments of the present invention to further develop a motor vehicle and a method so that more energy-efficient and user-friendly preparation of beverages is possible.

In particular by providing a supply line between the at least one fuel cell and the steam and/or liquid dispenser for supplying product water generated in the at least one fuel cell to the steam and/or liquid dispenser. This enables an improved use of resources, since the at least one fuel cell produces the product water as a by-product. Said product water is now used to prepare a beverage and no longer has to be removed from the vehicle unused. In addition, the product water generated by the fuel cell itself has a temperature in the range between 70° C. and 90° C., so that the product water does not have to be additionally heated for the preparation of a hot beverage. The term "product water" is understood to mean both the water generated by the at least one fuel cell and the steam generated by the fuel cell. The motor vehicle may also be driven by means of the at least one fuel cell, the motor vehicle having a fuel cell stack with a plurality of fuel cells. The device for preparing a beverage may also be supplied with energy by means of the at least one fuel cell or the fuel cell stack. Alternatively or additionally, the device is supplied with energy via a voltage source, for example via a battery arranged in the motor vehicle. The vessel can be formed as a beaker, a cup, a drinking glass or the like. The liquid dispenser can be arranged relative to the beverage in such a way that the water and/or the steam is dispensed into the vessel from above. In an alternative embodiment, the liquid can also be introduced into the vessel from below. This embodiment prevents scalding and thus increases the safety of the device when driving.

In order to be able to have available an adequate amount of water, it is provided in particular that a steam and/or liquid reservoir which is connected to the supply line or is coupled with the same in a fluid-mechanical manner for storing the product water is arranged between the at least one fuel cell and the steam and/or liquid dispenser. A sensor for monitoring the water quality may be associated with the steam and/or liquid reservoir.

In order to be able to clean the product water and to remove residues, it is advantageous if the steam and/or liquid reservoir comprises a filter element for processing the product water. The filter element can thereby comprise gravel and/or stone and/or plastic and/or metal and/or sand. In an alternative embodiment, the filter can comprise activated carbon or ion exchange materials. In one embodiment, the filter element is arranged exchangeably in the steam and/or liquid reservoir.

To enrich the product water and/or to improve the water quality, in particular to adjust the pH value and the electrical conductivity, it is provided that the steam and/or liquid reservoir is associated with an additive reservoir for supplying additives to the product water. Additives can thereby be minerals, vitamins or caffeine. In one embodiment, the additive reservoir is arranged in the steam and/or liquid reservoir. In an alternative embodiment, the additives are fed from the additive reservoir into the adjacent steam and/or liquid reservoir via an additive line. In a further alternative embodiment, at least some of the additives are supplied to the product water via a further additive line in the steam and/or liquid dispenser. In addition, in one embodiment, the additive reservoir has a plurality of separate chambers in which various additives can be accommodated and which have separate additive lines.

In order to prevent the steam and/or liquid reservoir from overflowing and to ensure that the product water is fresh and consumable, the steam and/or liquid reservoir has a discharge line, which may lead out of the vehicle, for discharging product water. In one embodiment, the product water is automatically emptied at regular time intervals. Alternatively or additionally, the user can also arrange for the steam and/or liquid reservoir to be emptied themselves.

For the preparation of coffee, tea or flavored beverages, it is particularly advantageous if the device has a flavor container into which a batch of substance to be extracted can be filled and/or inserted, and if the flavor container is located upstream or downstream of the steam and/or liquid dispenser in such a way that the product water is passed through the flavor container and thus through the batch of substance for its flavoring prior to discharging into the vessel. The charge of substance can be formed as coffee powder or tea or cocoa or milk powder or as a flavored powder or the like. In particular, the preparation of beverages containing caffeine can increase safety while driving. In addition, the batch of substance can be formed as a cup or pad. In an advantageous embodiment, the flavor container is formed as a drawer. In one embodiment, the flavor container is associated with a flavor container magazine in which a plurality of batches of substance are arranged and can be selected.

For simple operation of the device in the motor vehicle, a control and operating element may be provided for voice-controlled, gesture-controlled, or touch-controlled control of the device. The control and operating element can be formed as a button and/or as a microphone for speech recognition and/or as a camera for gesture-controlled control. This enables simple operation of the device and increases safety when a beverage is being prepared while driving.

In an alternative embodiment, a heating element and/or a cooling element for further heating or cooling of the product water can additionally be located upstream of the steam and/or liquid dispenser.

In particular, the object is achieved by a method for preparing a beverage, such as a hot beverage, in a motor vehicle comprising the following steps:
    guiding product water generated by at least one fuel cell to a steam and/or liquid dispenser, and
    dispensing a predetermined or predeterminable amount of the product water into a vessel by means of the steam and/or liquid dispenser.

This enables an energy-efficient method for preparing a beverage, in particular a hot beverage, without the need for an additional source of liquid.

To improve the quality of the product water, the method includes the following steps in particular:
    supplying at least one additive to the product water, and/or filtering the product water by means of a filter element.

To add flavor to the product water, the method also comprises the following steps:
    providing a batch of substance in a flavor container, and
    flavoring the product water by guiding the product water through the flavor container before dispensing takes place.

BRIEF DESCRIPTION OF THE SEVERAL VIEWS OF THE DRAWINGS

Further advantages, features, and details of embodiments of the invention are evident from the claims, the following description of embodiments, and the drawings.

DETAILED DESCRIPTION

Figure 1:
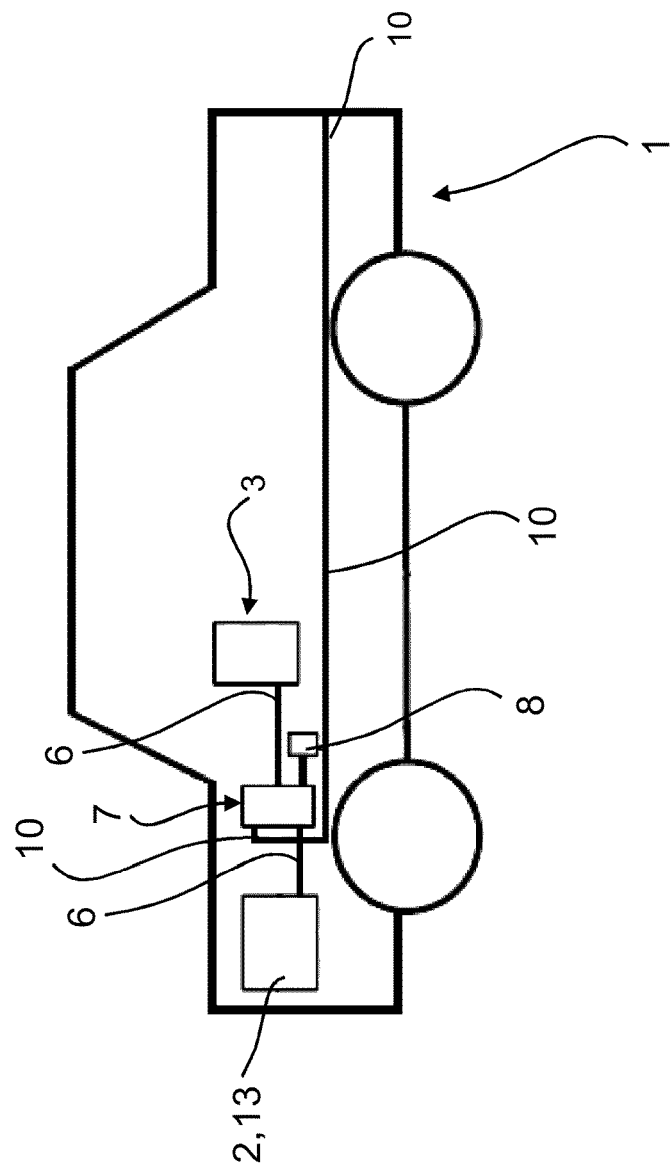
FIG. 1 shows a schematic view of a motor vehicle with a device for preparing a beverage.
Figure 3:
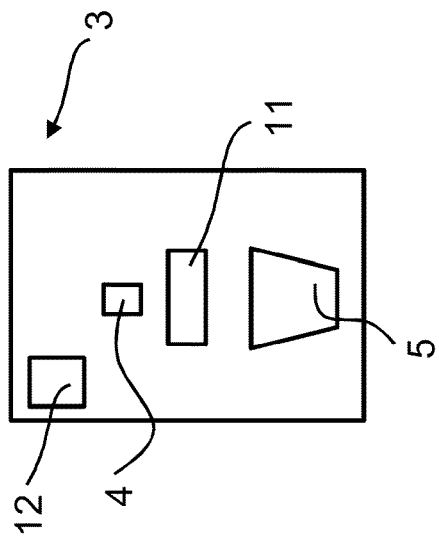
FIG. 3 shows a schematic front view of the device of FIG. 1.

FIG. 1 shows a motor vehicle 1 with a fuel cell stack 13 having a plurality of fuel cells 2 and with a device 3 for preparing a beverage, in particular a hot beverage. In FIG. 3, the front view of the device 3 is illustrated schematically. Said device 3 is arranged in the vehicle interior and may be integrated into the dashboard. In an alternative embodiment, the device 3 can also be integrated into the center console or attached to it. The device 3 comprises a steam and/or liquid dispenser 4 for dispensing a liquid into a vessel 5. The vessel 5 is formed as a cup, beaker, drinking glass or the like. A flavor container 11 is arranged between the steam and/or liquid dispenser 4 and the vessel 5 for flavoring the water in such a way that the water is passed through the flavor container 11 before the liquid is dispensed into the vessel 5. A batch of substance to be extracted can be filled and/or inserted into the flavor container 11, which may be formed as a drawer. The charge of substance can be coffee or tea or a flavored powder. It can be in loose form or as a cup or as a pad. To operate the device 3, a control and operating element 12 is provided, which in the present embodiment is formed as a button and thus enables touch-controlled control of the device 3.

FIG. 1 also shows that a supply line 6 is provided between the fuel cell stack 13 and the steam and/or liquid dispenser 4 of the device 3 for supplying product water generated in the fuel cell stack 13 to the steam and/or liquid dispenser 4. As a result, the product water generated in any case in the fuel cell stack 13 can be used to prepare a beverage instead of being discharged from the motor vehicle 1 unused. At the same time, the product water generated by the fuel cell stack 13 has a temperature of 70° to 90°, so that the product water already has the optimum consumption temperature for a hot beverage and does not have to be additionally heated.

Figure 2:
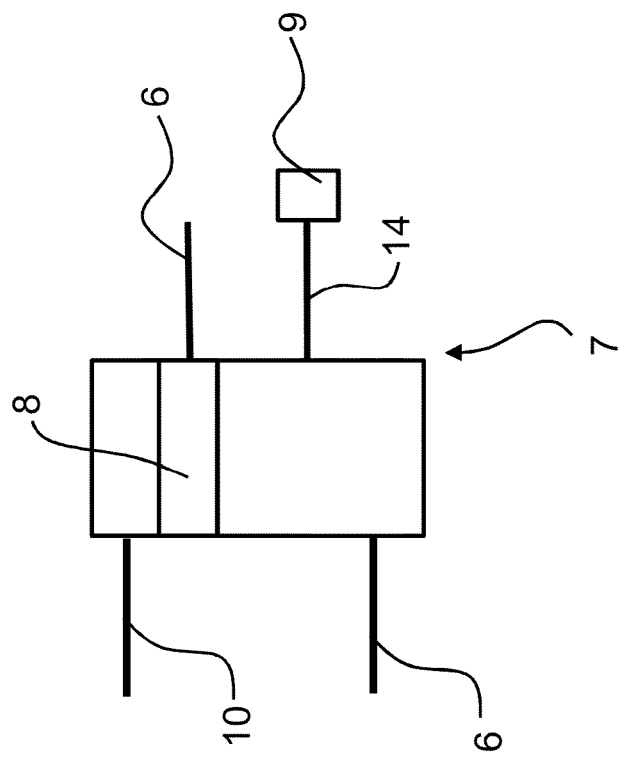
FIG. 2 shows a schematic illustration of the steam and/or liquid reservoir of FIG. 1.

In order to keep an adequate amount of water available, a steam and/or liquid reservoir 7 connected to the supply line 6 for storing the product water is arranged between the fuel cell stack 13 and the steam and/or liquid dispenser 4. As illustrated in FIG. 2, an exchangeable filter element 8 is in turn arranged in the steam and/or liquid reservoir 7 for processing the product water. The filter element 8 comprises gravel and/or stone and/or plastic and/or metal and/or sand. Alternatively, it can also comprise activated carbon or an ion exchange material. The reservoir can also have a heating device in order to heat the contents of the reservoir should it have cooled down. In addition, an additive reservoir 9 is associated with the steam and/or liquid reservoir 7. In order to supply additives to the product water, the additive reservoir 9 is connected to the steam and/or liquid reservoir 7 via an additive line 14. The additives can be both minerals, which are used to adjust the pH value and to adjust the electrical conductivity of the product water, in order to improve the drinking water quality, or also represent additives such as vitamins.

In order to keep the water in the steam and/or liquid reservoir 7 fresh or to ensure the water quality and/or to prevent the steam and/or liquid reservoir 7 from overflowing, a discharge line 10 is provided to discharge (excess) product water from the motor vehicle 1.

The method for preparing a beverage, in particular a hot beverage, in a motor vehicle 1 with the device 3 described above comprises the steps explained below. The product water generated in the fuel cell stack 13 is fed into the steam and/or liquid reservoir 7 via the supply line 6. There it is filtered by the filter element 8 and, if necessary, additives from the additive reservoir 9 are added to the product water to improve the water quality. The water quality may be monitored by a sensor, not shown. By actuating the control and operating element 12 formed as a button, the product water generated by the fuel cell stack 13 is guided through the supply line 6 to the steam and/or liquid dispenser 4. In a first embodiment, a corresponding batch of substance is provided in the flavor container 11 by actuating the control and operating element 12. Alternatively or additionally, the batch of substance can also be manually filled into the flavor container 11 before the control and operating element 12 is actuated. Before the product water is dispensed into the vessel 5, it is guided from the steam and/or liquid dispenser through the flavor container 11 and thus through the batch of substance and is thereby flavored.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A motor vehicle, comprising:
    a fuel cell stack including a plurality of fuel cells, wherein the fuel cell stack is formed to drive the motor vehicle; and
    a device for preparing a beverage, wherein the device for preparing a beverage has a steam and/or liquid dispenser for dispensing a steam and/or a liquid into a vessel, wherein a supply line is provided between the fuel cell stack and the steam and/or liquid dispenser for supplying product water generated in the fuel cell stack to the steam and/or liquid dispenser, wherein the device for preparing a beverage is integrated into a dashboard of a vehicle interior of the motor vehicle and has a flavor container formed as a drawer into which a batch of substance to be extracted can be filled and/or inserted, and the flavor container is located upstream or downstream of the steam and/or liquid dispenser in such a way that the product water is passed through the flavor container and thus through the batch of substance for its flavoring prior to discharging into the vessel.

2. The motor vehicle according to claim 1, wherein a steam and/or liquid reservoir which is connected to the supply line or is coupled with the same in a fluid-mechanical manner for storing the product water is arranged between the at least one fuel cell and the steam and/or liquid dispenser.

3. The motor vehicle according to claim 2, wherein the steam and/or liquid reservoir comprises a filter element for processing the product water.

4. The motor vehicle according to claim 2, wherein an additive reservoir is associated with the steam and/or liquid reservoir for supplying additives to the product water.

5. The motor vehicle according to claim 2, wherein the steam and/or liquid reservoir has a discharge line for discharging product water.

6. The motor vehicle according to claim 1, wherein a control and operating element is provided for voice-controlled, or gesture-controlled or touch-controlled control of the device.

7. A method for preparing a beverage in a motor vehicle including: a fuel cell stack including a plurality of fuel cells, wherein the fuel cell stack is formed to drive the motor vehicle; and a device for preparing a beverage, wherein the device for preparing a beverage has a steam and/or liquid dispenser for dispensing a steam and/or a liquid into a vessel, wherein a supply line is provided between the fuel cell stack and the steam and/or liquid dispenser for supplying product water generated in the fuel cell stack to the steam and/or liquid dispenser; wherein the device for preparing a beverage is arranged in a vehicle interior of the motor vehicle and has a flavor container into which a batch of substance to be extracted can be filled and/or inserted, and the flavor container is located upstream or downstream of the steam and/or liquid dispenser in such a way that the product water is passed through the flavor container and thus through the batch of substance for its flavoring prior to discharging into the vessel, the method comprising:

guiding the product water generated in the fuel cell stack to the steam and/or liquid dispenser;

providing the batch of substance in the flavor container;

flavoring the product water by guiding the product water through the flavor container; and using the steam and/or liquid dispenser to dispense a predetermined or predeterminable amount of the flavored product water into the vessel.

8. The method according to claim 7, further comprising: supplying at least one additive to the product water.

9. The method according to claim 7, further comprising: filtering the product water.

\* \* \* \* \*